(12) United States Patent
Harder et al.

(10) Patent No.: US 10,020,722 B2
(45) Date of Patent: Jul. 10, 2018

(54) SPECTRUM MODULATION FOR SWITCHING CIRCUITS

(71) Applicant: Texas Instruments Incorporated, Dallas, TX (US)

(72) Inventors: Christian Harder, Freising (DE); Markus Georg Rommel, Freising (DE); Stefan Reithmaier, Vilsheim (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/294,329

(22) Filed: Oct. 14, 2016

(65) Prior Publication Data
US 2018/0109176 A1    Apr. 19, 2018

(51) Int. Cl.
| H02M 1/16 | (2006.01) |
| H02M 3/158 | (2006.01) |
| H03C 3/02 | (2006.01) |
| H02M 1/00 | (2006.01) |

(52) U.S. Cl.
CPC ........... *H02M 1/16* (2013.01); *H02M 3/1582* (2013.01); *H03C 3/02* (2013.01); *H02M 2001/0012* (2013.01)

(58) Field of Classification Search
CPC ........ H02M 1/44; H02M 3/156; H02M 3/157; H02M 3/158; H02M 2001/0012; H02M 2003/158; H03C 1/00; H03C 1/02; H03C 1/06
See application file for complete search history.

(56) References Cited

U.S. PATENT DOCUMENTS

| 7,504,810 | B1 | 3/2009 | Tagare | |
| 7,944,192 | B2* | 5/2011 | Moussaoui | H02M 3/156 323/222 |
| 9,479,063 | B2* | 10/2016 | Pan | H02M 1/44 |
| 2005/0243894 | A1 | 11/2005 | Chen et al. | |
| 2007/0210776 | A1* | 9/2007 | Oka | H02M 1/44 323/283 |
| 2011/0101953 | A1* | 5/2011 | Cheng | H02M 1/44 323/311 |
| 2014/0111110 | A1* | 4/2014 | Qi | H05B 33/0818 315/210 |

(Continued)

OTHER PUBLICATIONS

Notification of Transmittal of the International Search Report and the Written Opinion of the International Searching Authority, or the Declaration, dated Feb. 21, 2018, 7 pages.

*Primary Examiner* — Matthew Nguyen
(74) *Attorney, Agent, or Firm* — Tuenlap D. Chan; Charles A. Brill; Frank D. Cimino

(57) ABSTRACT

A circuit includes a signal generator to generate an output signal to vary the switching frequency of a switching circuit to mitigate noise in the switching circuit. The signal generator includes a modulation waveform generator (MWG) to generate a ramp signal in response to a numerical input and a switching signal from the switching circuit. The ramp signal is employed to modulate the frequency of the output signal of the signal generator over a range of frequencies from a minimum frequency to a maximum frequency. A frequency adjuster circuit modulates the amplitude of the ramp signal by adjusting at least one of the minimum frequency or the maximum frequency of the range of frequencies.

18 Claims, 5 Drawing Sheets

(56) References Cited

U.S. PATENT DOCUMENTS

2015/0326116 A1* 11/2015 Zhang .................... H02M 1/44
323/288
2016/0218702 A1* 7/2016 Mainescu .......... H03K 5/15013

* cited by examiner

SPECTRUM MODULATION FOR SWITCHING CIRCUITS

TECHNICAL FIELD

This disclosure relates to integrated circuits and, more particularly, to a circuit and method to mitigate noise energy in a switching circuit via spectrum modulation.

BACKGROUND

Switching noise can be generated in any electrical circuit with regular switching activity. These circuits can include direct current (DC) DC-DC switching converters, such as charge pumps or inductive switch mode converters such as boost-mode or buck-mode converters, for example. Due to their regular switching activity, these switching circuits emit strong noise spurs or peaks at the switching frequency itself (e.g., 3 MHz) along with its associated harmonic spurs (e.g., 6 MHz, 9 MHz, and so forth). These noise spurs may interfere with other surrounding electrical devices near the switching circuits such as AM-radios, mobile communication devices, RFID tags (transmitter), or power over wireless applications, for example. One common technique to mitigate the noise spurs includes varying the switching frequency (f) of the circuit in order to redistribute or spread the noise energy over a broader spectrum and thus minimize the effect of any particular noise spur. In some conventional systems, complex and expensive counting circuits are employed to vary the switching frequency.

SUMMARY

This disclosure relates to a circuit and method to mitigate noise energy in a switching circuit via spectrum modulation. In one example, a circuit includes a signal generator to generate an output signal to vary the switching frequency of a switching circuit to mitigate noise in the switching circuit. The signal generator includes a modulation waveform generator (MWG) to generate a ramp signal in response to a numerical input and a switching signal from the switching circuit. The ramp signal is employed to modulate the frequency of the output signal of the signal generator over a range of frequencies from a minimum frequency to a maximum frequency. A frequency adjuster circuit modulates the amplitude of the ramp signal by adjusting at least one of the minimum frequency or the maximum frequency of the range of frequencies.

In another example, an integrated circuit includes a modulation waveform generator (MWG) to generate a ramp signal in response to a numerical input and a switching signal from a switching circuit. The ramp signal is employed to modulate the frequency of the switching circuit over a range of frequencies from a minimum frequency to a maximum frequency. A frequency adjuster circuit modulates the amplitude of the ramp signal by adjusting at least one of the minimum frequency or the maximum frequency of the range of frequencies. A number generator generates the numerical input to the MWG. The number generator generates a varying numerical pattern to vary the numerical input to the MWG.

In yet another example, a method includes generating a ramp signal in response to a numerical input and a switching signal from a switching circuit. The ramp signal is employed to modulate the frequency of the switching circuit over a range of frequencies from a minimum frequency to a maximum frequency. The method includes modulating the amplitude of the ramp signal by adjusting at least one of the minimum frequency or the maximum frequency of the range of frequencies. The method includes generating a variable numerical pattern to vary the numerical input over time.

DETAILED DESCRIPTION

This disclosure relates to a circuit and method to mitigate noise energy in a switching circuit via spectrum modulation. A signal generator circuit is provided to vary the switching frequency of a switching circuit. Varying the switching frequency of the switching circuit can be referred to as frequency spreading in order to spread the energy associated with noise spurs at the switching frequency across a broader frequency spectrum. The frequency spreading reduces the overall energy of the noise spurs and thus mitigates noise energy emanating from the switching circuit. The signal generator includes a modulation waveform generator (MWG) to generate a ramp signal in response to a numerical input and a switching signal from the switching circuit. The switching signal can be a signal the controls the on or off time of the switching circuit, for example. The numerical input can be received from a number generator providing a variable numeric pattern to the MWG.

The ramp signal from the MWG can be employed to modulate the frequency of the output signal of the signal generator over a range of frequencies from a minimum frequency to a maximum frequency which has the effect of spreading the switching frequency over a broader spectrum. In conventional circuits, complex and expensive counter circuits were utilized to generate the ramp signal (e.g., 2048 counter chain). In one example of the present disclosure, the ramp signal can be a triangular waveform which is generated with minimal counting elements (e.g., three counters) which is much more economical and efficient over prior circuits. Other waveform types from the MWG are possible such as saw-tooth waveforms, for example. A frequency adjuster circuit modulates the amplitude of the ramp signal by adjusting at least one of the minimum frequency or the maximum frequency of the range of frequencies. By adjusting the amplitude of the ramp signal in this manner, relatively inexpensive counting circuits can be employed to generate the ramp signal. Counter circuits in the MWG can be provided to count up and down to generate the ramp waveform. Counting can be controlled via the frequency adjuster circuit such that the counting circuits count up or down and/or are modified by the numerical input from the number generator. Such modifications of the counting sequence have the effect of changing the amplitude and frequency of the modulation spreading frequency which provides a more economical and higher performance spreading circuit (e.g., noise peaks reduced in amplitude utilizing less complex hardware).

Figure 1:
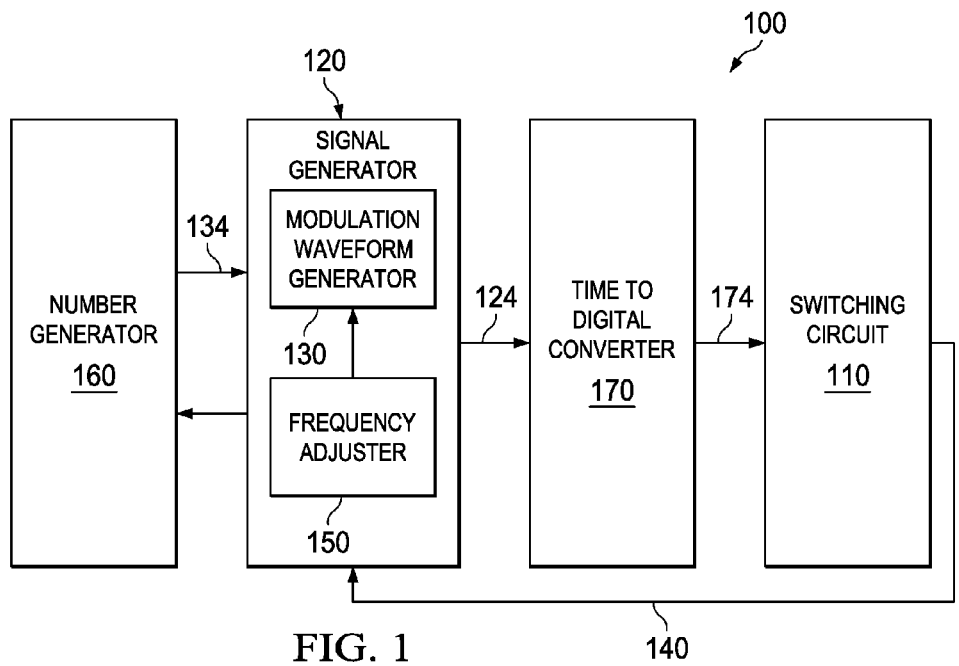
FIG. 1 illustrates an example schematic block diagram of a circuit to provide spread spectrum modulation for a switching circuit.

FIG. 1 illustrates an example a circuit 100 to provide spread spectrum modulation for a switching circuit 110. As used herein, the term circuit can include a collection of active and/or passive elements that perform a circuit function such as an analog circuit or control circuit, for example. Additionally or alternatively, the term circuit can include an integrated circuit where all and/or some of the circuit elements are fabricated on a common substrate, for example. As used herein, the term spectrum modulation refers to varying the switching frequency of the switching circuit 110 in addition to normal switching operations or patterns of the switching circuit. Such spectrum modulation spreads the energy of switching noise generated by the switching circuit 110 over a larger frequency spectrum which mitigates the peak energy of the switching noise.

As shown in the example of FIG. 1, the circuit 100 includes a signal generator 120 to generate an output signal 124 to vary the switching frequency of the switching circuit 110 to mitigate noise in the switching circuit. As noted previously, noise can be reduced by spreading the energy associated with any given switching noise peak associated with the switching circuit 110 across a wider signal and energy spectrum. This is achieved by modulating or varying the switching frequency of the switching circuit 110. The signal generator 120 includes a modulation waveform generator (MWG) 130 to generate a ramp signal in response to a numerical input 134 and a switching signal 140 from the switching circuit 110. The switching signal 140 can be a signal to energize or de-energize a storage element (e.g., TON or TOFF signal) such as an inductor of a capacitor. The switching signal 140 can be utilized as a clocking signal for the signal generator 120.

The ramp signal is employed to modulate the frequency of the output signal 124 of the signal generator 120 over a range of frequencies from a minimum frequency to a maximum frequency. A frequency adjuster circuit 150 modulates the amplitude of the ramp signal by adjusting at least one of the minimum frequency or the maximum frequency of the range of frequencies. A number generator 160 generates the numerical input 134 to the MWG 130. The number generator 160 generates a varying numerical pattern 134 to vary the numerical input to the MWG 130. In one example, the number generator 160 can be a pseudo-random generator to generate the varying numerical pattern to vary the numerical input 134 to the MWG 130 however any type of circuit that generates a variable numeric pattern over time can be employed.

As will be illustrated and described below with respect to FIG. 3, the MWG 130 can include an N-bit up-down counter to generate the ramp signal in response to the switching signal 140, where N is a positive integer. The frequency adjuster 150 can include a register to control whether the N-bit up-down counter of the MWG 130 counts up or down in response to the switching signal 140. The register in the frequency adjuster 150 changes the direction of counting if the up-down counter reaches a maximum counting value, a minimum counting value, or the up-down counter is equal in value to the numerical pattern of the number generator 160. In this manner, both the amplitude and frequency of the ramp signal and the associated output signal 124 are varying over time to provide spectrum spreading. The ramp signal described herein can be generated as a triangular waveform or a saw-tooth waveform from the MWG 130, for example. A time-to-digital converter (TDC) 170 that is driven from the output signal 124 of the signal generator 124 can be employed to generate a control signal 174 to control an on or off time of the switching signal 140. The TDC 170 can be substantially any type of circuit that converts a varying numerical input to a digital control and timing signal 174.

The switching circuit 110 can be substantially any type of circuit that varies its switching frequency in response to the control signal 174 from the TDC 170. For example, the switching circuit 110 can be a boost DC/DC converter, a buck converter, a buck/boost converter, or a charge pump, for example. To mitigate noise spurs as described herein, the switching frequency f of the switching circuit 110 is varied by the signal generator 120 and in response to the numerical input 134 from the number generator 160. This can be achieved by controlling a number N of equally sized steps between a minimum frequency (fmin) and a maximum frequency (fmax). The difference between those frequencies can be referred to as the frequency spread, where fspread=fmax−fmin. A frequency step can be defined as: fstep=fspread/(N−1). In general, a high spread allows better damping, but is more complex and expensive to implement. By modulating the amplitude of the output signal 124 as described herein, simplified ramp generating circuits can be utilized in the MWG 130. For instance, a minimal 3-bit counter can be utilized to generate the ramp signal in the MWG 130 described herein as opposed to a more elaborate counter scheme in prior circuits while achieving similar or superior noise mitigation performance.

Figure 2:
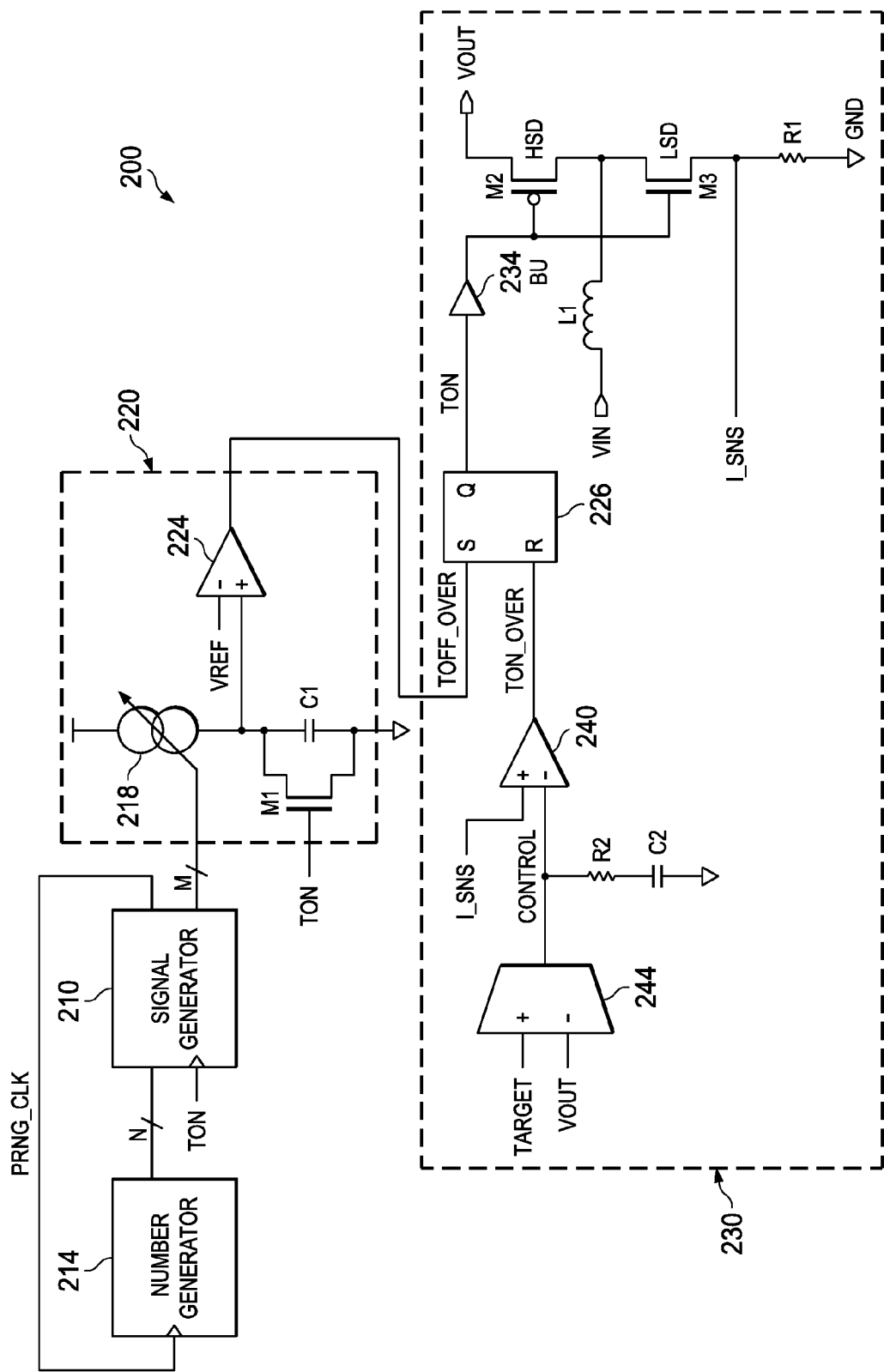
FIG. 2 illustrates an example of a circuit to provide spread spectrum modulation utilizing a current controlled switching circuit as an example.

FIG. 2 illustrates an example of a circuit 200 to provide spread spectrum modulation utilizing a current controlled switching circuit as an example. In this example, a signal generator 210 receives a numeric input N from a number generator 214 (e.g., pseudo-random generator) and generates a numeric output M having both ramp ascending and descending numerical patterns along with variable amplitude adjustments (see e.g., waveform pattern of FIG. 4). A switching signal TON (e.g., switching signal 140 of FIG. 1) clocks the signal generator 210. A clock PRNG_CLK is provided by the signal generator 210 to clock the number generator 214.

The numeric output M of the signal generator 210 drives a variable current source 218 in a time-to-digital converter (TDC) circuit 220. The current source 218 drives a capacitor C1 which is reset via transistor switch device M1 and switching signal TON. A comparator 224 in the TDC 220 compares a reference voltage VREF to the voltage on capacitor T1 to generate output timing signal TOFF_OVER to a flip flop 226 which generates the switching signal TON for a switching circuit 230. As noted previously, the switching circuit 230 can include substantially any type of circuit that charges or discharges a switching element such as an inductor and/or capacitor. In this example, an inductor L1 is driven by the switching circuit 230 in a buck DC/DC converter configuration. The switching circuit 230 can include a buffer 234 which drives switch devices M2 and M3 which magnetically charge and discharge L1 to generate VOUT from input VIN. A sense resistor R1 can provide current feedback I_SNS to a comparator 240 which generates output TON_OVER to the flip flop 226 by comparing a control signal CONTROL to feedback I_SNS. The control signal CONTROL is generated via comparator 244 which compares a target reference voltage TARGET to the output voltage VOUT. A filter of R2 and C2 can be provided to filter the signal CONTROL from the comparator 244.

When the switching signal TON is high, the LSD transistor M3 is on, causing the current through the inductor L1 to rise. If this current reaches a threshold defined by the voltage CONTROL, which is generated by amplifying/integrating the difference between VOUT and TARGET, the comparator 244 triggers and TON is reset to low. Now, the timer capacitor C1 is not shorted by M1, causing the voltage at the comparator 224 positive input to rise linearly with time. As it reaches the voltage on C1 reaches VREF, the comparator 224 initiates the next period by setting the flip flop 226. The TDC 220 including the digitally controlled current source 218, capacitor C1, reset transistor M1 and comparator 224 is but one possible example of a digital-to-time converter as described herein. The digitally controlled time period starts, when TON goes low. The digital-to-time converter 220 should be configured in a manner that the resulting switching frequency resides between fmin and fmax for the respective digital inputs.

In this example, the switching frequency is not adjusted directly, but by setting TOFF although in other examples, TON may be the controlled variable. The duty cycle D is the ratio of TON to the period TON+TOFF. It can be defined by the input and output voltage of the boost converter in this example such as:
D=TON/(TON+TOFF)=1−(VIN/VOUT), where the switching frequency f is calculated as follows and depends on TOFF, if VIN and VOUT are constant:
f=1/(TON+TOFF)=(VIN/VOUT)/TOFF. By controlling the TOFF time, the switching circuit 230 switching frequency can be set.

Figure 3A:
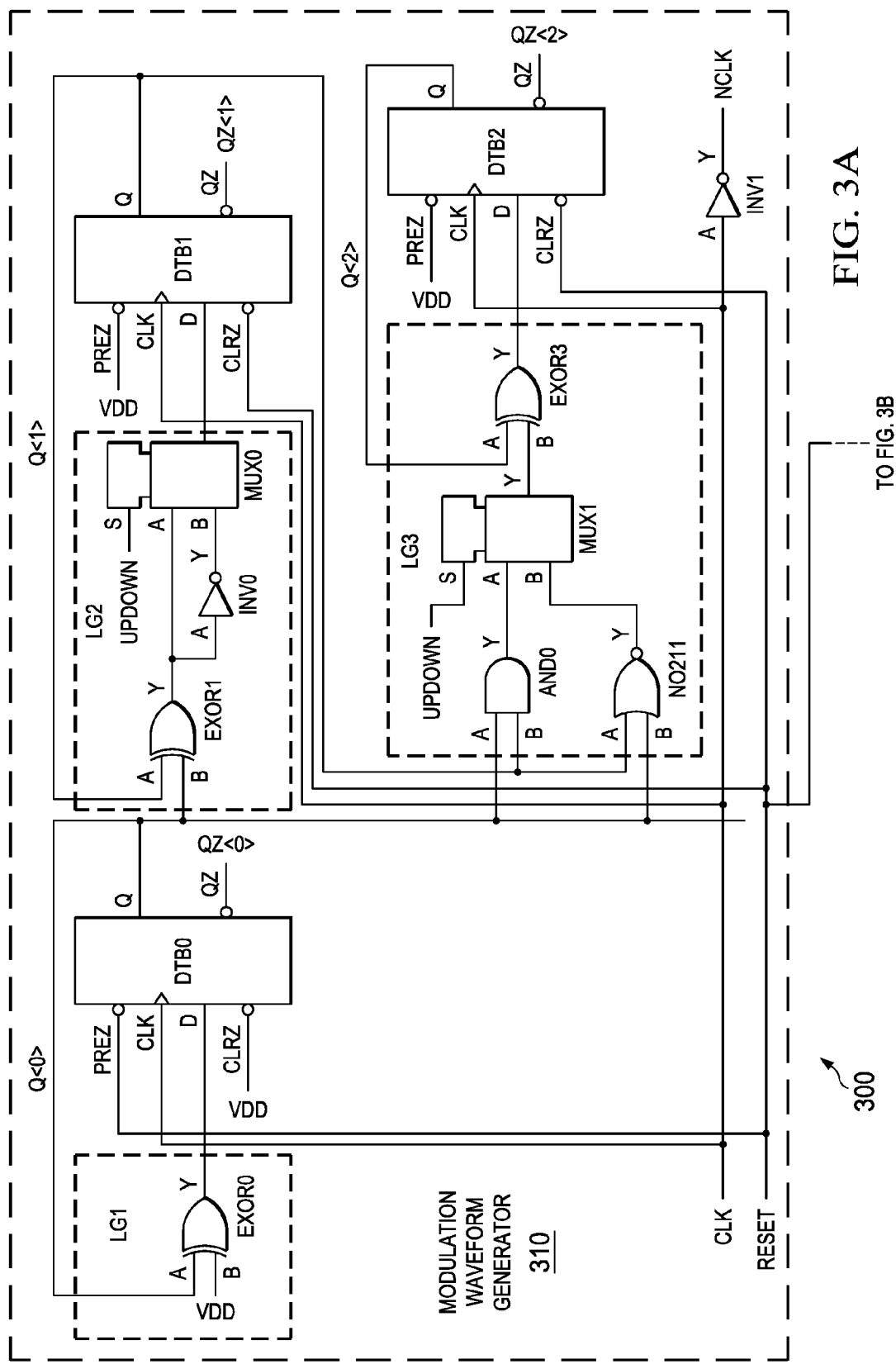
FIGS. 3A and 3B illustrate an example of a signal generator to provide spectrum modulation for a switching circuit.
Figure 3B:
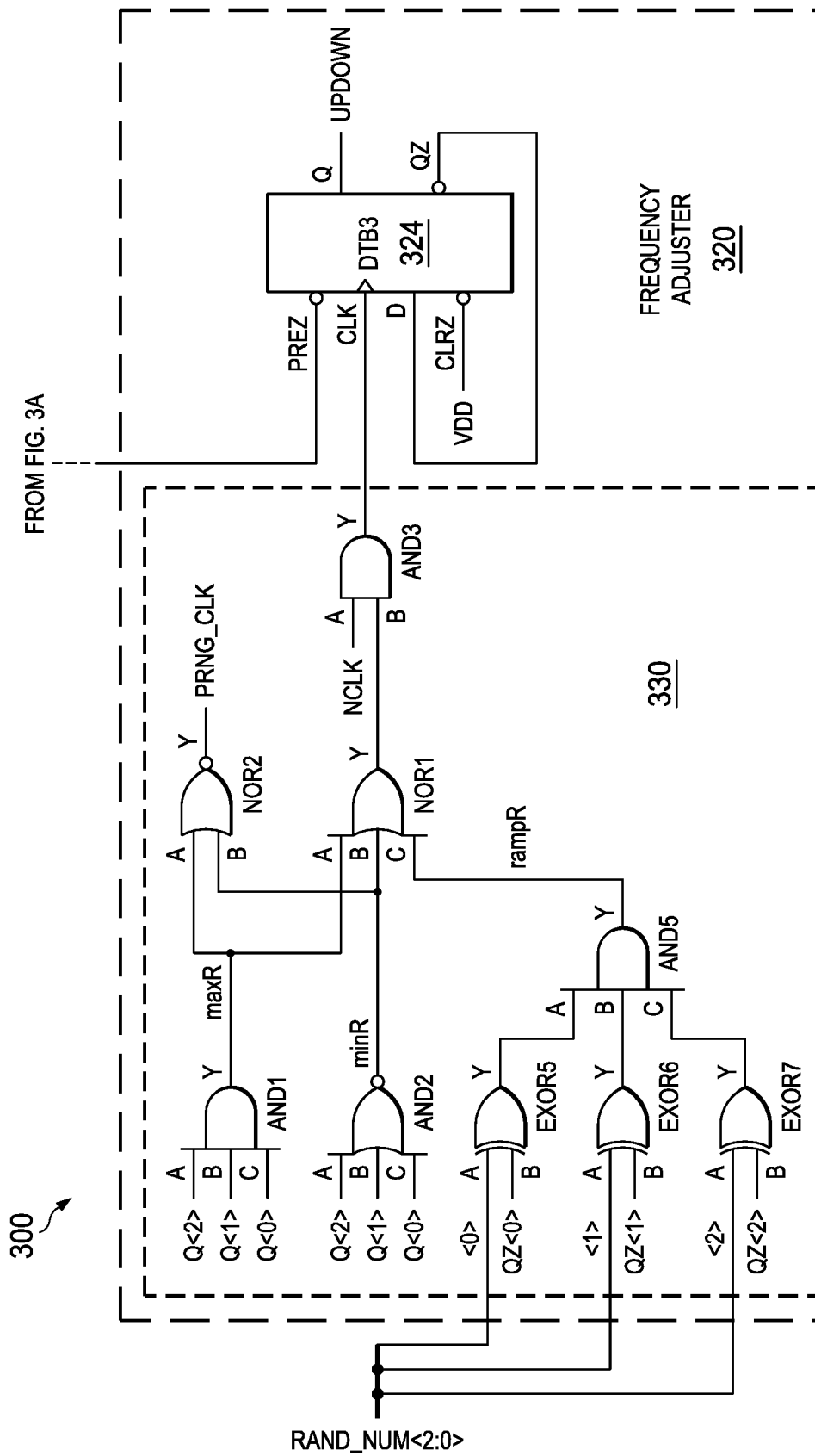

FIGS. 3A and 3B illustrate an example of a signal generator 300 to provide spectrum modulation for a switching circuit. With respect to FIG. 3A, the signal generator 300 includes modulation waveform generator (MWG) 310 having up/down counters DTB0, DTB1, and DTB2 in this example. As noted previously, the number of counters can be more or less than three counters. Each of the counters DTB0 though DTB2 have an associated reset logic circuit shown as LG1, LG2, and LG3, respectively. The counters are clocked via signal CLK which can be driven from the switching signal shown as TON described above. A frequency adjuster circuit 320 shown on FIG. 3B includes a register 324 to control the counting and reset action of the MWG 310 via signal output shown as updown. A control logic circuit 330 of FIG. 3B controls the register 324 according to various conditions that are described below. The control logic circuit 330 receives a numeric input shown as RAND_NUM <2:0> and generates an output clock PRNG_CLK to drive the number generators described herein. A reset signal RESET can be provided to reset both the MWG 310 of FIG. 3A and the frequency adjuster 320 of FIG. 3B.

The switching frequency of the switching circuits described herein can be varied in a low number of steps N between fmin and fmax which reduces the number of counters in the MWG 310. Thus, N being intentionally low in these examples, this allows the implementation in hardware to be straight-forward and cost efficient. The switching frequency can be by a triangular modulation signal (or other ramp signal such as a saw tooth), but in contrast to conventional circuits, its amplitude changes by adjusting fmax or fmin or both randomly. A signal varying both frequency limits when the ramp signal reaches the minimum or maximum limits is shown in the waveform example of FIG. 4 and the resulting spectrum in FIG. 5. The damping is about −25 dB in these examples.

To achieve such a damping behavior, the number generator described herein is clocked by the signal PRNG_CLK which is an output of the logic circuit 330 of FIG. 3B. One possible implementation for a 3 bit (N=8) modulation waveform generator is depicted in the circuit 300 although other implementations are possible (e.g., more or less up/down counters). In this example, the MWG 310 of FIG. 3A includes three registers, two MUX's and logic gates to form a 3 bit up/down counter. The register 324 of FIG. 3B holds the information whether the counter should count up or down. It is toggled in three cases: The counter's value Q<2:0> is 3b (3 bit binary)−000 (min), 3b−111 (max) or equal to the output of a random number generator RAND_NUM<2:0>. A new random number is requested when the counter reaches its minimum or maximum value by the signal PRNG_CLK.

Figure 4:
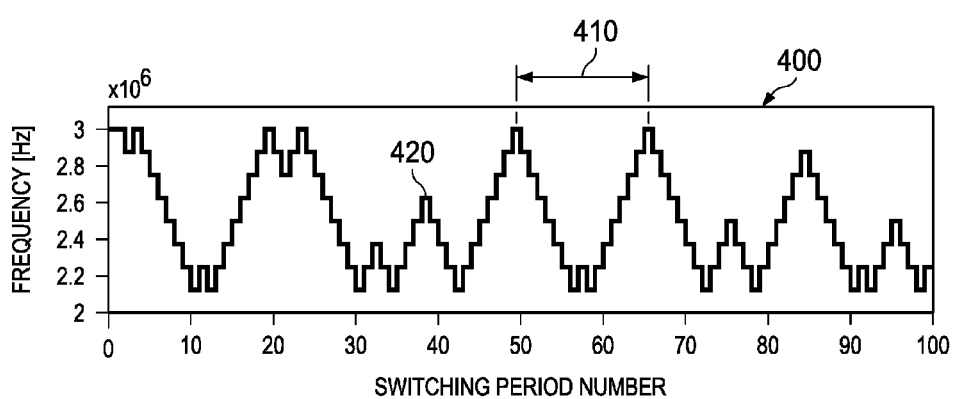
FIG. 4 illustrates an example waveform illustrating a ramp signal having both amplitude and frequency modulation for spectrum modulation.

FIG. 4 illustrates an example waveform 400 illustrating a ramp signal having both amplitude and frequency modulation for spectrum modulation. In this example, the waveform is 400 is generated in response to the circuit 300 depicted in FIG. 3. Two triangular peaks are represented at 410 where each peak is a product of 8 counting steps which represents the maximum up and down counting values from the 3-bit counters in FIG. 3. As noted previously, the counting action generating the waveform 400 is changed under three conditions including when the counter's value Q<2:0> is—000 (min), 111 (max) or equal to the output of a random number generator RAND_NUM<2:0>. This has the effect of modulating both the amplitude and the frequency of the modulation signal (also referred to as output signal from signal generator 120 in FIG. 1). A modulated portion of the waveform 400 is shown at 420.

Figure 5:
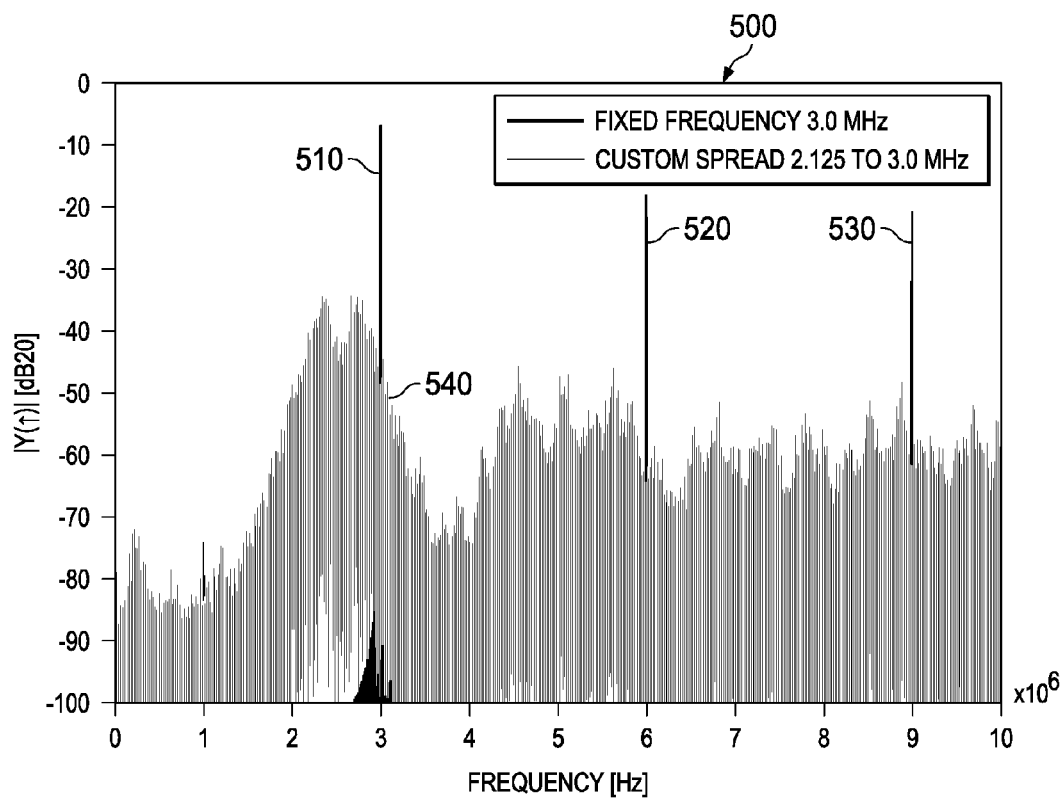
FIG. 5 illustrates an example signal diagram illustrating spread spectrum modulation mitigating the effects of switching noise signal peaks.

FIG. 5 illustrates an example signal diagram 500 illustrating spread spectrum modulation mitigating the effects of switching noise signal peaks. Example switching noise peaks are shown at 510, 520, and 530. These occur in this example at 3 MHZ (the fundamental switching frequency), 6 MHZ (harmonic), and 9 MHZ (harmonic). After frequency spreading has been applied as described herein, a signal 540 is overlaid to show the reduction in the peak values at 510, 520, and 530. The peak reduction due to spectrum spreading as described herein can be −25 DB or greater, for example.

Figure 6:
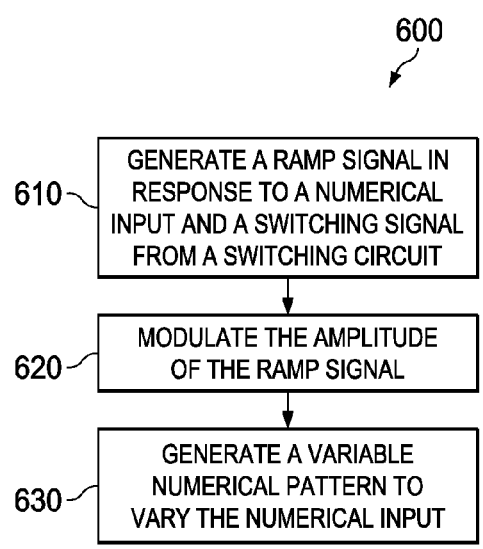
FIG. 6 is a flow diagram that illustrates an example method to provide spread spectrum modulation for a switching circuit.

In view of the foregoing structural and functional features described above, an example method will be better appreciated with reference to FIG. 6. While, for purposes of simplicity of explanation, the method is shown and described as executing serially, it is to be understood and appreciated that the method is not limited by the illustrated order, as parts of the method could occur in different orders and/or concurrently from that shown and described herein. Such methods can be executed by various components configured in an integrated circuit, processor, or a controller, for example.

FIG. 6 illustrates an example method 600 to provide spread spectrum modulation for a switching circuit. At 610, the method includes generating a ramp signal in response to a numerical input and a switching signal from a switching circuit (e.g., via modulation waveform generator 130 of FIG. 1). The ramp signal is employed to modulate the frequency of the switching circuit over a range of frequencies from a minimum frequency to a maximum frequency. At 620, the method 600 includes modulating the amplitude of the ramp signal by adjusting at least one of the minimum frequency or the maximum frequency of the range of frequencies (e.g., via frequency adjuster 150 of FIG. 1). At 630, the method 600 includes generating a variable numerical pattern to vary the numerical input over time (e.g., via number generator 160 of FIG. 1). The method 600 can also include generating a control signal to control an on or off time of the switching signal (e.g., signal TON of FIG. 2).

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. Additionally, where the disclosure or claims recite "a," "an," "a first," or "another" element, or the equivalent thereof, it should be interpreted to include one or more than one such element, neither requiring nor excluding two or more such elements.

What is claimed is:

1. A circuit, comprising:
    a signal generator to generate an output signal to vary the switching frequency of a switching circuit to mitigate noise in the switching circuit, the signal generator comprising:
        a modulation waveform generator (MWG) to generate a ramp signal in response to a numerical input and a switching signal from the switching circuit, the ramp signal employed to modulate the frequency of the output signal of the signal generator over a range of frequencies from a minimum frequency to a maximum frequency, and the MWG including an N-bit up-down counter to generate the ramp signal in response to the switching signal, N being a positive integer; and
        a frequency adjuster circuit to modulate the amplitude of the ramp signal by adjusting at least one of the minimum frequency or the maximum frequency of the range of frequencies.

2. The circuit of claim 1, further comprising a number generator to generate the numerical input to the MWG, the number generator generates a varying numerical pattern to vary the numerical input to the MWG.

3. The circuit of claim 2, wherein the number generator is a pseudo-random generator to generate the varying numerical pattern to vary the numerical input to the MSG.

4. The circuit of claim 1, wherein the frequency adjuster includes a register to control whether the N-bit up-down counter of the MWG counts up or down in response to the switching signal.

5. The circuit of claim 4, wherein the register changes the direction of counting if the up-down counter reaches a maximum counting value, a minimum counting value, or the up-down counter is equal in value to the numerical pattern of the number generator.

6. The circuit of claim 1, wherein the ramp signal is generated as a triangular waveform or a saw-tooth waveform from the MWG.

7. The circuit of claim 1, further comprising a time-to-digital converter (TDC) that is driven from the output signal of the signal generator, the TDC generating a control signal to control an on or off time of the switching signal.

8. The circuit of claim 7, further comprising a switching circuit that varies its switching frequency in response to the control signal from the TDC.

9. The circuit of claim 8, wherein the switching circuit is at least one of a boost converter, a buck converter, a buck/boost converter, or a charge pump.

10. An integrated circuit, comprising:
    a modulation waveform generator (MWG) to generate a ramp signal in response to a numerical input and a switching signal from a switching circuit, the ramp signal employed to modulate the frequency of the switching circuit over a range of frequencies from a minimum frequency to a maximum frequency, and the MWG includes an N-bit up-down counter to generate the ramp signal in response to the switching signal, N being a positive integer;
    a frequency adjuster circuit to modulate the amplitude of the ramp signal by adjusting at least one of the minimum frequency or the maximum frequency of the range of frequencies; and
    a number generator to generate the numerical input to the MWG, the number generator generates a varying numerical pattern to vary the numerical input to the MWG.

11. The integrated circuit of claim 10, wherein the number generator is a pseudo-random generator to generate the varying numerical pattern to vary the numerical input to the MSG.

12. The integrated circuit of claim 10, wherein the frequency adjuster includes a register to control whether the N-bit up-down counter of the MWG counts up or down in response to the switching signal.

13. The integrated circuit of claim 12, wherein the register changes the direction of counting if the up-down counter reaches a maximum counting value, a minimum counting value, or the up-down counter is equal in value to the numerical pattern of the number generator.

14. The integrated circuit of claim 10, further comprising a time-to-digital converter (TDC) that is driven from the ramp signal of the MWG, the TDC generating a control signal to control an on or off time of the switching signal.

15. The integrated circuit of claim 14, further comprising a switching circuit that varies its switching frequency in response to the control signal from the TDC.

16. The integrated circuit of claim 15, wherein the switching circuit is at least one of a boost converter, a buck converter, a buck/boost converter, or a charge pump.

17. A method, comprising:
    generating a ramp signal using an N-bit up-down counter in response to a numerical input and a switching signal from a switching circuit, the ramp signal employed to modulate the frequency of the switching circuit over a range of frequencies from a minimum frequency to a maximum frequency;
    modulating the amplitude of the ramp signal by adjusting at least one of the minimum frequency or the maximum frequency of the range of frequencies; and
    generating a variable numerical pattern to vary the numerical input over time.

18. The method of claim 17, further comprising generating a control signal to control an on or off time of the switching signal.

* * * * *